Nov. 13, 1928.                                                                    1,691,733
                           N. A. NORDIN
                   CAMERA SUPPORT AND MANIPULATOR
                       Filed July 25, 1927           2 Sheets-Sheet 2
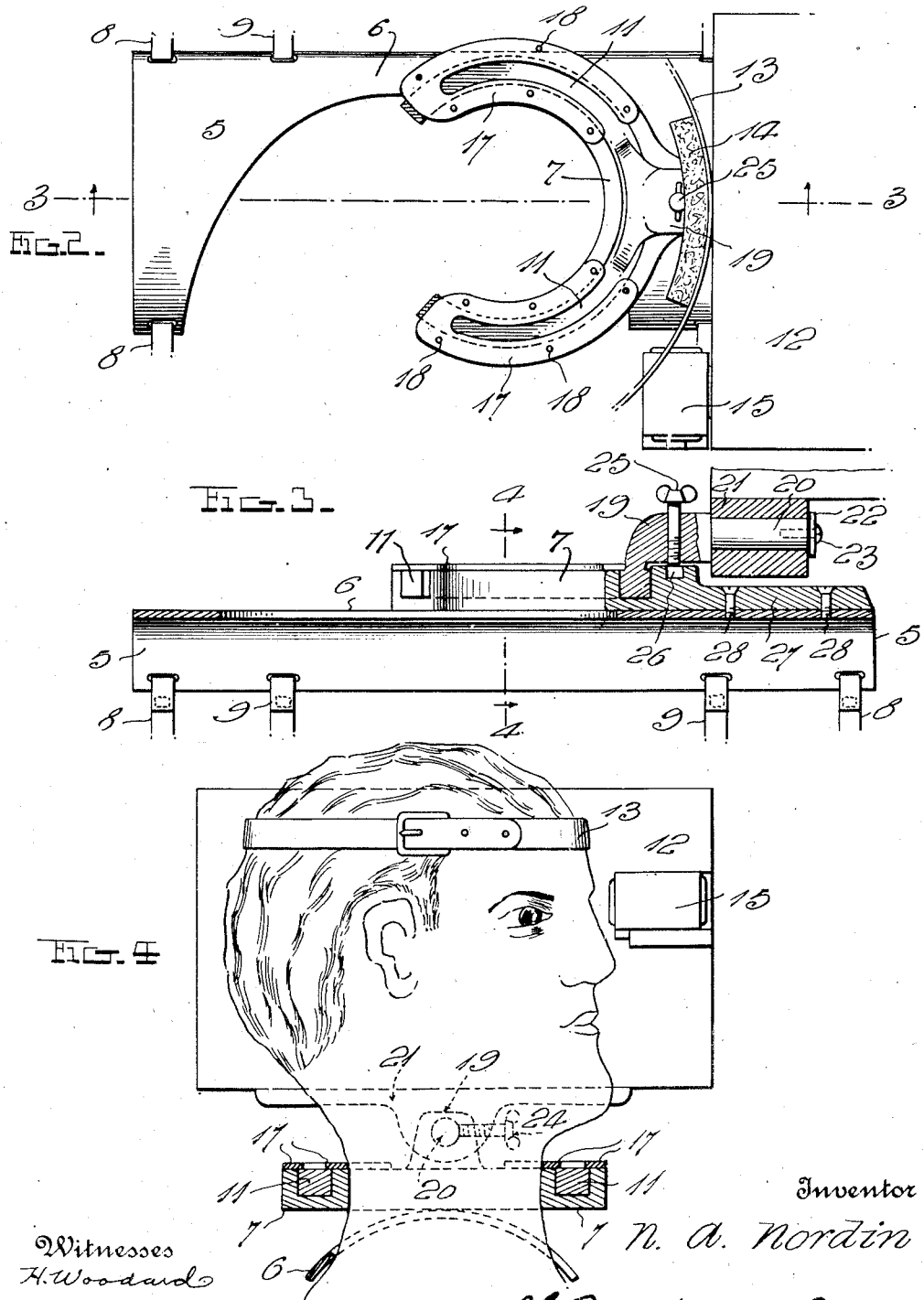

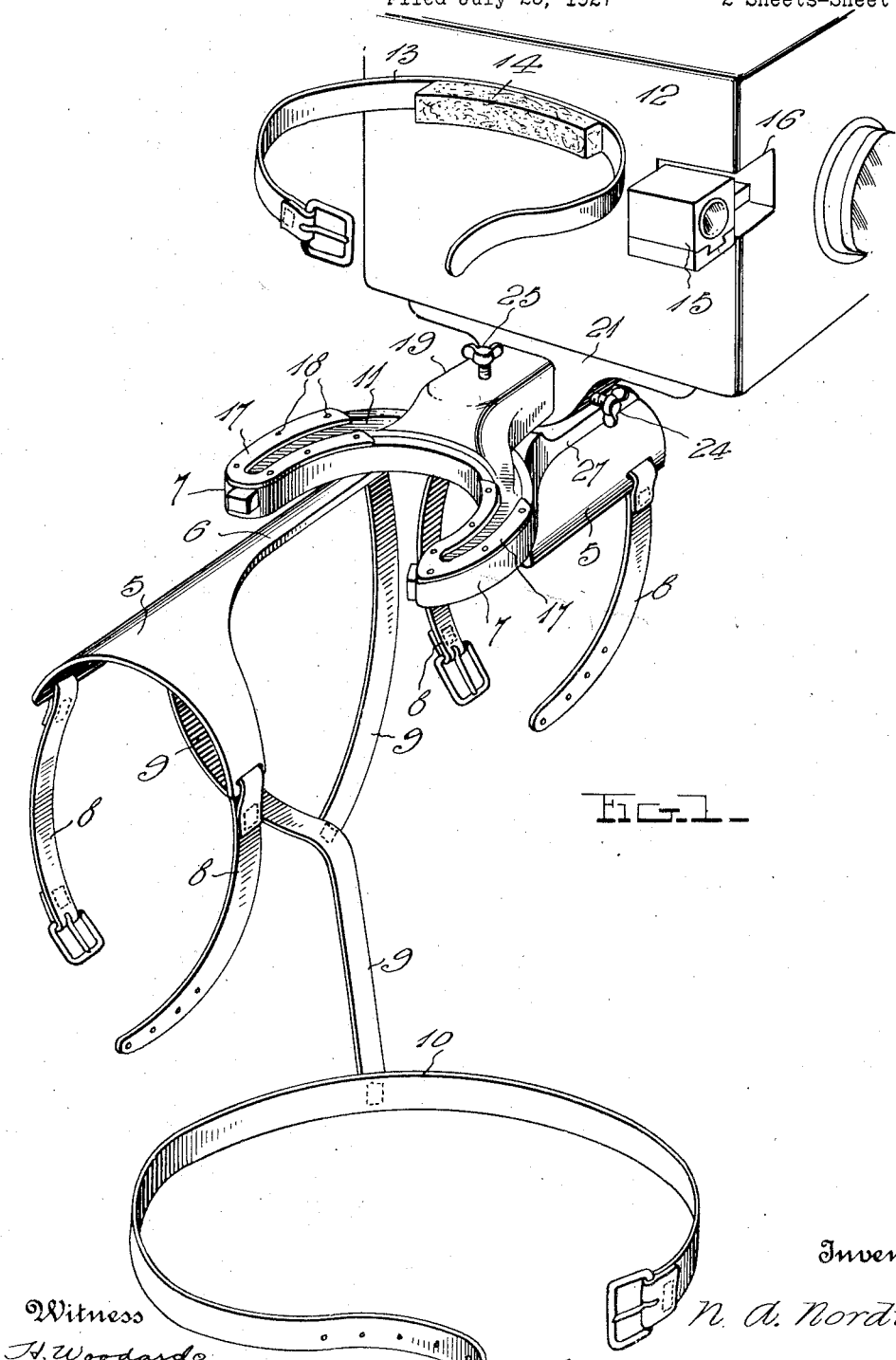

Patented Nov. 13, 1928.

1,691,733

UNITED STATES PATENT OFFICE.

NILS ALBIN NORDIN, OF SELDOVIA, TERRITORY OF ALASKA.

CAMERA SUPPORT AND MANIPULATOR.

Application filed July 25, 1927. Serial No. 208,368.

The invention aims to provide a new and improved means whereby a camera may be supported at one side of the user's head and swung either horizontally or vertically toward an object to be photographed, by merely moving the head. Thus, with one eye, the user may sight through a finder at one side of the camera for the purpose of accurately positioning the latter before operation of the shutter.

A further aim is to provide the camera with a finder which may be projected laterally therefrom for use or moved into a recess of the camera case when not in use.

With the foregoing in view, the invention resides in the novel subject matter hereinafter described and claimed, the description being supplemented by the accompanying drawings.

Fig. 1 is a perspective view.

Fig. 2 is a top plan view.

Fig. 3 is a vertical sectional view on line 3—3 of Fig. 2.

Fig. 4 is a vertical transverse sectional view on line 4—4 of Fig. 3, showing the device applied.

In the drawings above briefly described, one form of construction has been illustrated and while this construction will be rather specifically described, it is to be understood that within the scope of the invention as claimed, variations may be made.

The numerals 5 designate two saddles to rest upon the user's shoulders, said saddles being rigidly connected by a back portion 6. One of these saddles rigidly carries an arcuate, horizontally disposed track 7 adapted for substantially concentric relation with the user's neck. Straps 8 are connected with the saddles 5 for passage under the arm-pits to secure said saddles in place and to prevent forward tilting of these saddles and the track 7, under the weight of the camera, I connect other strapping 9 with the back portion 6 and provide a belt 10 to which said strapping 9 is secured.

An arcuate camera-supporting shoe 11 is slidably engaged with the track 7 and is provided with means for supporting a camera 12, in such manner that said camera may swing vertically with respect to the shoe and may turn horizontally with the shoe. A head strap 13 is provided for connecting the camera with the user's head and an appropriate head pad 14 may be provided either on said strap or on the camera near the strap. This camera is provided with a finder 15 which is normally housed in a recess 16 in the camera case. When the camera is to be used however, the finder may be projected from said recess, into line with one of the user's eyes, permitting him to readily sight therethrough for the purpose of properly directing the camera for the proposed exposure. Turning the head horizontally will swing the camera horizontally and tilting the head forwardly or rearwardly will vertically swing said camera, so that it may be accurately positioned with ease. In this connection, it may be explained that the camera 12 may either be an ordinary photographic camera, or an automatic motion picture camera.

The track 7 is preferably of channel-shape to slidably receive the arcuate shoe 11, and said shoe may be held in the track by any desired means, such as the plates 17 secured by fasteners 18 to the track. This shoe 11, in the construction shown, is provided with a projection 19 overlying the track-carrying saddle 5. To this projection 19, the camera 12 is pivoted on a horizontal axis for vertical swinging. This pivotal mounting of the camera may be obtained in any desired manner. For illustrative purposes, a bearing stud 20 is shown projecting outwardly from the projection 19 and received in a bearing 21 which is suitably secured to the bottom of the camera. Accidental removal of the bearing from the stud, may be prevented by any desired means, such as the washer 22 secured to the free end of said stud by a screw 23. A set screw 24 is preferably threaded through the bearing 21 for contact with the stud 20 to hold the camera against loose pivotal movement when it is not in use. Also, to hold the shoe 11 against sliding along the track 7, when the device is not being used, I may employ suitable means such as a screw 25 threaded through the projection 19 and projectible at will into a socket 26. In the present showing, this socket is formed in the upper side of an attaching arm 27 with which the track 7 is provided, said arm being secured by screws or the like 28 to the underlying saddle 5.

By employing the general construction shown and described or a substantial equivalent thereof, camera mounting and manipulating means are provided which will permit quick and easy positioning of the camera to take any desired exposure. The device is particularly adaptable for use when riding horseback but obviously is not restricted to such use.

I claim:

1. A camera support and manipulator comprising a body-carried support having an arcuate track for disposition in substantially concentric relation with the user's neck, a camera-supporting shoe connected with said track for movement along the same, and camera-manipulating means for engagement with the user's head, whereby upon turning of the head the shoe will be moved along the track and the camera consequently swung horizontally.

2. A camera support and manipulator comprising a body-carried support, a camera pivotally mounted on said support, and camera-manipulating means for engagement with the user's head, whereby the camera may be swung about its pivotal mounting by movement of the head.

3. A camera support and manipulator comprising a body-carried support having an arcuate track for disposition in substantially concentric relation with the user's neck, a camera-supporting shoe connected with said track for movement along the same and provided with vertically swingable means for connection to the camera, and camera-manipulating means for engagement with the user's head, whereby turning of the head or tilting it upwardly or downwardly will similarly move the camera.

4. In a camera support and manipulator, a pair of connected saddles to rest on the user's shoulders, body-engaging straps for holding said saddles in place, an arcuate track carried by and disposed over one of said saddles for disposition in substantially concentric relation with the user's neck, and a camera-supporting shoe connected with said track for movement along the same.

5. In combination, means for supporting a camera movably at one side of the user's head, head-engaging means connected with the camera for transmitting movement of the head to said camera, and a finder laterally spaced from the camera for disposition in front of one of the user's eyes.

6. In combination, a camera for disposition at one side of the user's head, and means for connecting the camera with the head, whereby movements of the head may be imparted to the camera.

7. A structure as specified in claim 6; together with a finder laterally spaced from the camera for disposition in front of one of the user's eyes.

In testimony whereof I have hereunto affixed my signature.

NILS ALBIN NORDIN.